United States Patent
Ben-Ayun et al.

(10) Patent No.: US 8,165,545 B2
(45) Date of Patent: Apr. 24, 2012

(54) TERMINAL FOR USE IN A WIRELESS COMMUNICATION SYSTEM AND A METHOD OF OPERATION THEREOF

(75) Inventors: Moshe Ben-Ayun, Shoham (IL); Ovadia Grossman, Tel-Aviv (IL); Salomon Serfaty, Doar Gaash (IL); Gadi Shirazi, Ramat Gan (IL)

(73) Assignee: Motorola Solutions, Inc., Schaumburg, IL (US)

( * ) Notice: Subject to any disclaimer, the term of this patent is extended or adjusted under 35 U.S.C. 154(b) by 884 days.

(21) Appl. No.: 12/280,823

(22) PCT Filed: Mar. 6, 2007

(86) PCT No.: PCT/US2007/063356
§ 371 (c)(1),
(2), (4) Date: Aug. 27, 2008

(87) PCT Pub. No.: WO2007/103904
PCT Pub. Date: Sep. 13, 2007

(65) Prior Publication Data
US 2009/0197549 A1    Aug. 6, 2009

(30) Foreign Application Priority Data
Mar. 7, 2006    (GB) .................................. 0604533.0

(51) Int. Cl.
*H04B 7/08* (2006.01)
(52) U.S. Cl. ..... 455/140; 455/132; 455/134; 455/226.2; 455/277.1; 455/277.2; 370/208

(58) Field of Classification Search .................. 455/140, 455/132–134, 226.2, 277.1, 277.2; 370/208
See application file for complete search history.

(56) References Cited

U.S. PATENT DOCUMENTS

| | | | |
|---|---|---|---|
| 5,036,532 A | 7/1991 | Metroka | |
| 6,473,601 B1 * | 10/2002 | Oda | .............................. 455/132 |
| 7,356,322 B2 * | 4/2008 | Hammerschmidt et al. | .. 455/254 |
| 2003/0072396 A1 * | 4/2003 | Binshtok et al. | .............. 375/346 |
| 2005/0255815 A1 | 11/2005 | Hammerschmidt | |
| 2006/0068854 A1 | 3/2006 | Sandhu | |
| 2007/0115801 A1 * | 5/2007 | Li et al. | ......................... 370/208 |

FOREIGN PATENT DOCUMENTS

| | | |
|---|---|---|
| EP | 1233530 A1 | 8/2002 |
| WO | WO2005060574 A2 | 7/2005 |

* cited by examiner

*Primary Examiner* — Sanh Phu
(74) *Attorney, Agent, or Firm* — Anthony P. Curtis; Daniel R. Bestor

(57) ABSTRACT

A terminal (200) and method for operation thereof for use in a wireless communication system (100), the terminal including a plurality of antennas (215, 235, 255) and a plurality of receiver chains (217, 237, 257) each including an associated one of the antennas, the terminal being operable to receive a signal including a plurality of time divided portions including a first portion (303) and a second portion (304), characterized in that the terminal is operable in a manner such each of the plurality of receiver chains is active when the first portion of the signal is being received and at least one of the receiver chains is inactive when the second portion of the signal is being received.

15 Claims, 4 Drawing Sheets

TERMINAL FOR USE IN A WIRELESS COMMUNICATION SYSTEM AND A METHOD OF OPERATION THEREOF

FIELD OF THE INVENTION

The present invention relates to a terminal for use in a wireless communication system, a system including the terminal and a method of operation of the terminal. In particular, the invention relates to a terminal having multiple antennas and multiple receiver chains. The system may comprise a Wireless Local Area Network (WLAN), for example one using procedures specified in the IEEE (Institute of Electrical and Electronic Engineers) 802.11 standard.

BACKGROUND OF THE INVENTION

Terminals operating in wireless communication systems are known which employ a plurality of antennas to co-operate in the form of a smart antenna system. In such a terminal, each antenna is connected to a separate associated receiver chain, as well as to a separate associated transmitter chain. An incoming signal can be received in each of the receiver chains via each of the associated antennas. A known data sequence or pattern included in a signal when transmitted by a transmitting terminal may be used in the receiving terminal including the multiple antennas to estimate from the signals received in each of the receiver chains a value of the propagation distance from the transmitting terminal that the signal has travelled. The propagation distance is known in the art as the 'channel'. The respective values estimated for the channel using the multiple receiver chains are used in a computation by the receiving terminal to estimate a direction between the transmitting terminal and the receiving terminal. The direction estimated by the receiving terminal including the multiple antennas is employed in a transmission mode by that terminal to direct a transmitted signal back to the original transmitting terminal. Signals are constructed in each of the multiple transmitter chains of the terminal which when sent via the associated multiple antennas form a transmitted beam in the required direction.

Terminals employing multiple antennas as described above may for example be used in WLANs (Wireless Local Area Networks), such as WLANs which operate using procedures specified in the 802.11 standard of the IEEE (IEEE, 1997). This standard referred to herein as the '802.11 standard', defines a protocol for communication between components of the WLAN. Many commercially available products operate in accordance with this standard. WLANs such as those operating in accordance with the 802.11 standard can exhibit one of two different basic network architectures, namely ad hoc and infrastructure-based network architectures. Ad hoc architectures include several client nodes using the same frequency for communication without an infrastructure. Infrastructure-based architectures include an infrastructure node, called an access point or 'AP', which may for example comprise a connectivity point to a central computer processor. Several client terminals or nodes are operably connected via an AP. The client terminals may for example be connectivity points providing connectivity to computer peripheral devices.

Many terminals operating in wireless communication systems such as WLANs are powered by a battery or other local energy source and it is desirable to introduce measures in such terminals in order to save energy.

SUMMARY OF THE INVENTION

Embodiments of the present invention will now be described by way of example with reference to the accompanying drawings, in which:

DESCRIPTION OF EMBODIMENTS OF THE INVENTION

Figure 1:
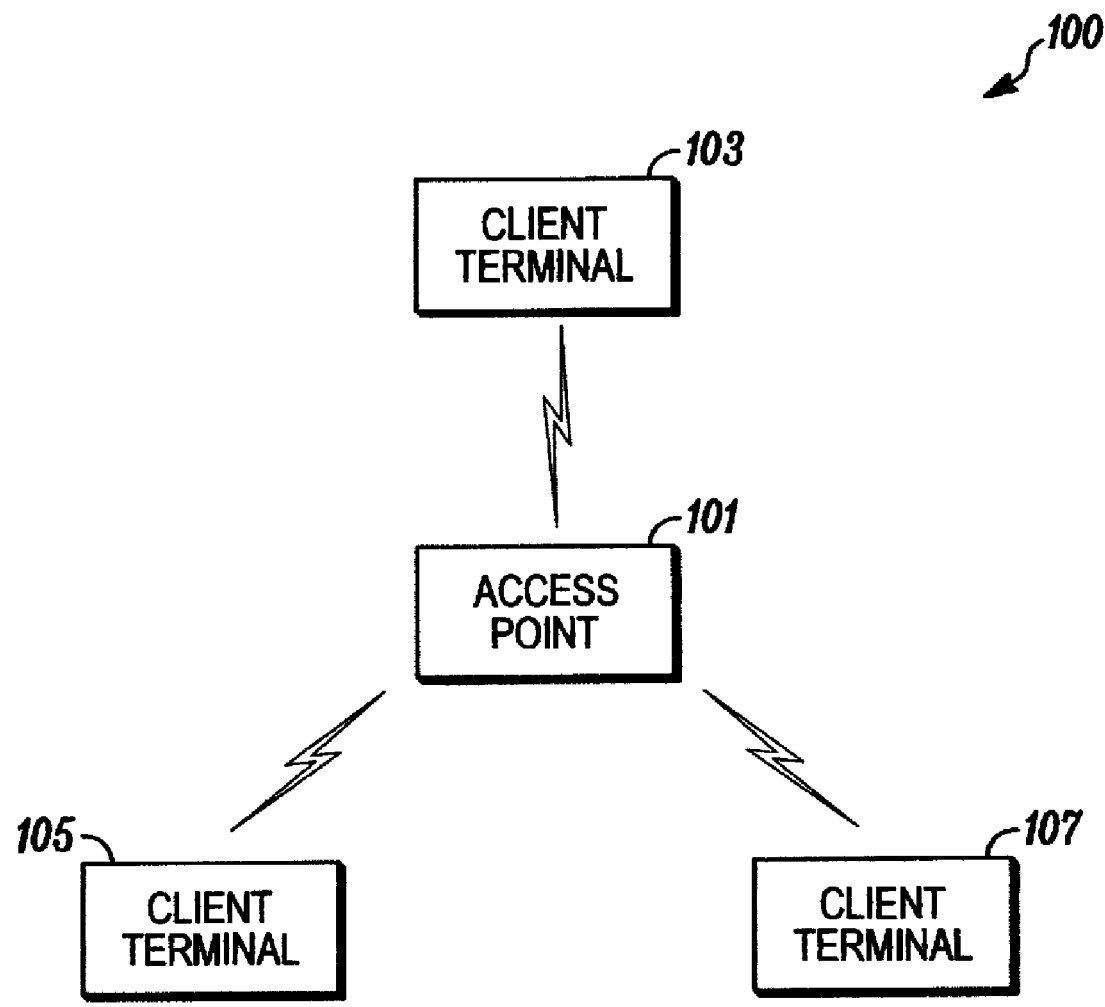
FIG. 1 is a schematic diagram of a communication system which may be adapted to operate in accordance with an embodiment of the invention.

FIG. 1 is a schematic diagram of a wireless communication system 100. The system 100 illustrates a system which may be adapted to operate in accordance with an embodiment of the invention. The system 100 may for example be a WLAN system, although use of the invention is not limited to WLANs. The system 100 may operate in accordance with protocol procedures defined in an industry standard specification, such as that defined by the IEEE 802.11 standard or another suitable standard. The system 100 may operate in a suitable frequency band selected according to the application in which the system 100 is to be used. For example, where the system 100 is to be used in public safety applications it may operate in a fifty (50) MegaHertz (MHz) band near four point nine (4.9) GigaHertz (GHz) which has been allocated for public safety applications.

The system 100 includes an AP 101 which is an Access Point, also known in the art as a 'base station' or an 'infrastructure node'. The AP 101 is in wireless communication with each of a plurality of client terminals, also known as 'stations', 'STAs', 'client nodes' or 'wireless device enablers'. Three of the client terminals are shown in FIG. 1, namely a client terminal 103, a client terminal 105 and a client terminal 107. The client terminals 103, 105 and 107 may be fixed in position or may be mobile. The client terminals 103, 105 and 107 have an association with the AP 101 such that they are served for wireless communications via the AP 101. The AP 101 may be operably linked with one or more other APs (not shown) in a known manner to form a network or 'distribution system'. Thus the AP 101 serves each of the client terminals 103, 105 and 107 with communications to or from one or more other client terminals (not shown) in a known manner. The one or more other client terminals may be terminals associated with the AP 101 or associated with another AP (not shown) to which the AP 101 is linked.

Figure 2:
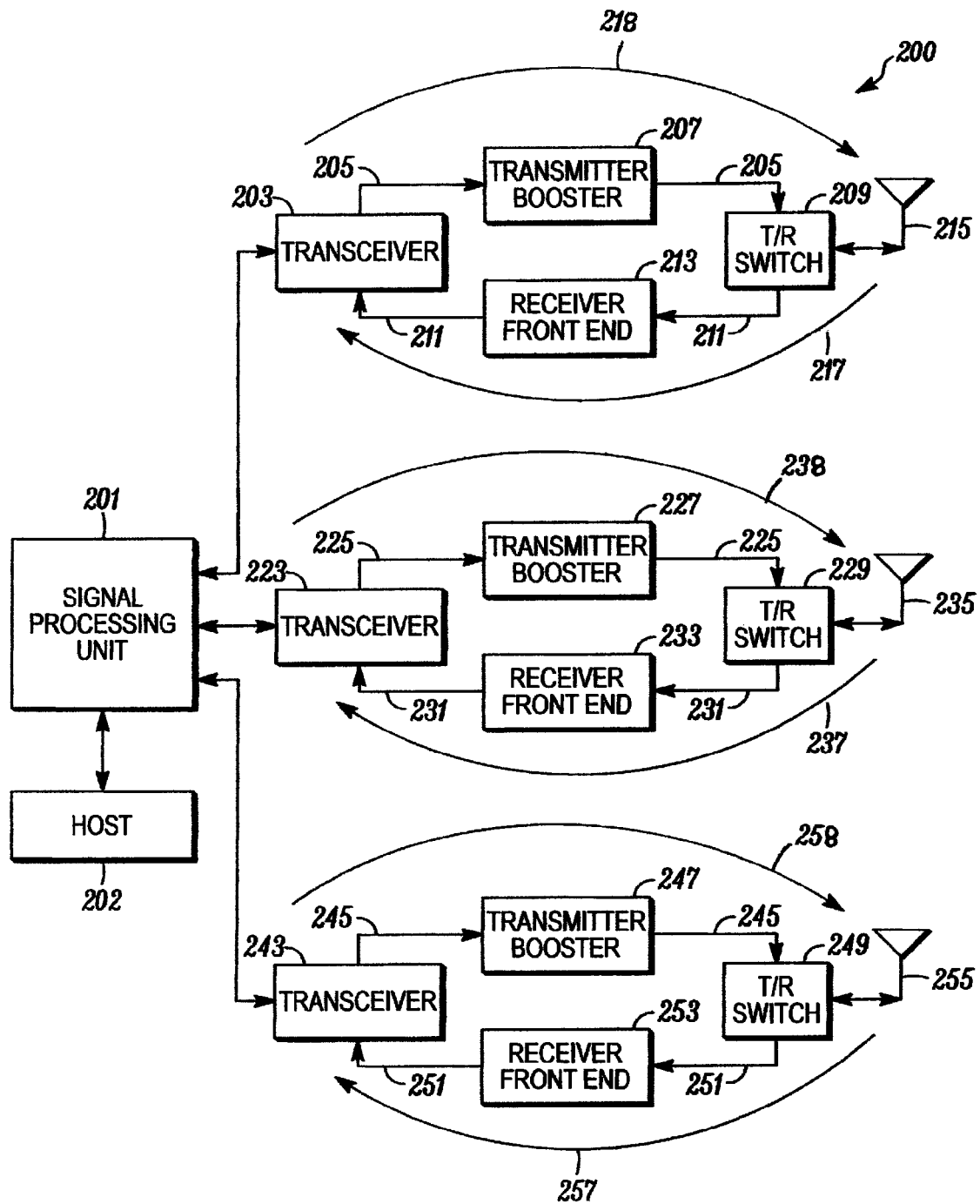
FIG. 2 is an illustrative form of client terminals in the system of FIG. 1.

FIG. 2 is a block schematic diagram of an illustrative form of the client terminal 103 of the system 100. The illustrative form is one in which the client terminal 103 is a station (STA) 200. Each of the other client terminals of the system 100 may also have the form of the STA 200. The STA 200 includes a signal processing unit 201, which may comprise a programmed semiconductor microprocessor integrated circuit, which carries out baseband signal processing, computational, memory and control functions in the STA 200. The signal processing unit 201 is connected to a host 202, which may for example be a device (located inside or outside the STA 200)

on which a data processing application is running. The signal processing unit 201 is also connected separately to each of a plurality of (at least three) radio frequency (RF) transceivers of which a transceiver 203, an RF transceiver 223 and an RF transceiver 243 are shown.

A transmit path 205 is connected from the RF transceiver 203 via a transmitter booster 207 to a transmit/receive (T/R) switch 209. A receive path 211 in parallel with the transmit path 205 is connected from the T/R switch 209 via a receiver front end 213 to the RF transceiver 203. The T/R switch 209 is also connected to an antenna 215 and, under control of switching signals from the signal processing unit 201, connects the antenna 215 either to the transmit path 205 or to the receive path 211, in respectively a transmission mode or a reception mode.

A transmit path 225 is connected from the RF transceiver 223 via a transmitter booster 227 to a T/R switch 229. A receive path 231 in parallel with the transmit path 225 is connected from the T/R switch 229 via a receiver front end 233 to the RF transceiver 223. The T/R switch 229 is also connected to an antenna 235 and, under control of switching signals from the signal processing unit 201, connects the antenna 235 either to the transmit path 225 or to the receive path 231, in respectively a transmission mode or a reception mode.

A transmit path 245 is connected from the RF transceiver 243 via a transmitter booster 247 to a T/R switch 249. A receive path 251 in parallel with the transmit path 245 is connected from the T/R switch 249 via a receiver front end 253 to the RF transceiver 243. The T/R switch 249 is also connected to an antenna 255 and, under control of switching signals from the signal processing unit 201, connects the antenna 255 either to the transmit path 245 or to the receive path 245, in respectively a transmission mode or a reception mode.

In a transmission mode, data to be transmitted by RF communication from the STA 200 undergoes baseband processing in the signal processing unit 201 to form modulation signals in a known manner. The modulation signals are delivered to each of the RF transceivers 203, 223 and 243 to be converted into modulated RF signals having properties selected in a manner to be described in more detail later. The modulated RF signals produced by the RF transceivers 203, 223 and 243 are delivered for power boosting (power amplification) respectively to the transmitter boosters 207, 227 and 247 and are then fed via the switches 209, 229 and 249 respectively to the antennas 215, 235 and 255 from which they are sent over the air as radiated RF signals.

In a reception mode of the STA 200, a radiated RF signal received by each of the antennas 215, 235 and 255 is delivered respectively to the receiver front ends 213, 233 and 253 via the T/R switches 209, 229 and 249. The received signals undergo some known front end processing such as channel filtering and low noise amplification in the receiver front ends 213, 233 and 253. Following such processing, the received signals are delivered to the RF transceivers 203, 223 and 243 in which they are demodulated. The RSSI (received signal strength indication) of each of the received signals is measured in the transceivers 203, 223 and 243 and is used by the signal processing unit 201 in a manner to be described later. Demodulation signals representing data which has been transmitted over-the-air are extracted from the received RF signals in the transceivers 203, 223 and 243 in a known manner and are passed to the signal processing unit 201 for baseband processing.

A receiver chain 217 is formed by the antenna 215, the T/R switch 209, the receive path 211, the receiver front end 213 and the RF transceiver 203. Similarly, a receiver chain 237 is formed by the antenna 235, the T/R switch 219, the receive path 231, the receiver front end 233 and the RF transceiver 223. Similarly, a receiver chain 257 is formed by the antenna 255, the T/R switch 249, the receive path 251, the receiver front end 253 and the RF transceiver 243. The receiver chain 217, the receiver chain 237 and the receiver chain 257 are referred to herein collectively as the 'receiver chains' (or in the singular as a 'receiver chain').

Transmitter chains are similarly formed between each of the RF transceivers 203, 223 and 243 and each of the corresponding antennas 215, 235 and 255 via the respective transmit paths 205, 225 and 245. These transmitter chains are indicated in FIG. 2 by arrows labelled respectively by reference numerals 218, 238 and 258.

The STA 200 includes a smart antenna system in which the receiver chains in the reception mode, and the transmitter chains in the transmission mode, co-operate together in a manner now to be described.

Consider that the STA 200 is receiving an RF signal from the AP 101 acting as a transmitting terminal. The propagation path, known in the art as the 'channel', from the AP 101 to each one of the antennas 215, 235 and 235 of the STA 200 is in general different, and an estimation of each of these channel values may be carried out in a known manner. For example, in an example of a known method of carrying out such an estimation, a known data pattern or sequence is transmitted in a signal from the transmitting terminal, the AP 101, and a form of the data pattern or sequence received via each of the receiver chains 217, 237 and 257 is compared in the signal processing unit 201 with a further known pattern or sequence which would be expected to be received if the channel were ideal (e.g. reflection free).

Thus, multiple estimations of the channel are obtained using multiple receiver chains in the STA 200. Using known theory, by knowing the channel from the transmitting terminal, the AP 101, to each of the antennas of the receiving terminal, the STA 200, it is possible for the STA 200 to carry out a computation to estimate a direction from the AP 101 to the STA 200, and thereby to form a radiation beam which can be sent back toward the AP 101 in a direction which a reverse of that which has been estimated. This procedure is known in the art as 'beam forming'. This procedure involves multiplying each of the received signals obtained in the respective receiver chains of the STA 200 by a complex weighting (which is a weighting coefficient for narrow band signals and a complex weighting vector for wideband signals). Each weighting is obtained by a mathematical calculation to find the solution of known adaptive antenna equations.

It is assumed in the beam forming procedure that the channel between the AP 101 and each antenna of the STA 200 is reciprocal, meaning that the propagation path from the AP 101 to the STA 200 is identical to propagation path from the STA 200 to the AP 101. (This is true when both uplink and downlink signals are at the same frequency, such as in a WLAN). The complex weightings obtained from the received signals in the respective receiver chains of the STA 200 are employed in constructing signals to be transmitted back from the STA 200 to the AP 101. Thus, in a transmission mode of the STA 200, such RF signals having appropriate weightings (a complex function of signal amplitude and phase) are produced respectively by the transceivers 203, 223 and 243 and are provided via the respective transmitter chains 218, 238 and 258 to the antennas 215, 235 and 255 for over-the-air delivery. The combination of these signals forms a single transmitted beam that is directed along the reverse of the estimated direction back toward the AP 101. By beam forming in this way, instead of having the RF energy of each of the antennas 215, 235 and 255 transmitted omnidirectionally, the RF radiated energy is concentrated so that it is directed toward the target of the AP 101 therefore providing RF gain. According to known theory, the gain obtainable is 10·log 10(N) where N is the number of antennas used. This gain is obtainable both for transmission and for reception.

The AP 101 may be more powerful than the client terminal 103 (and other client terminals of the system 100), which, as noted earlier, may all have the form of the STA 200. For example, the mean transmitted power of the AP 101 may typically be about one (1) Watt (W), and the mean transmitted power of the STA 200 may typically be about 0.1 W. This may result in the STA 200 being able to receive a strong RF signal from the AP 101, but the AP 101 being able to receive only a weaker RF signal sent from the STA 200, owing to the lower transmission power of the STA 200. Thus, the enhanced gain produced by beam forming in the transmission mode of the STA 200 provides a stronger received signal at the AP 101.

However, the present inventors have appreciated that enhanced gain although available in both transmission and reception modes of the STA 200 may not be essential in all portions of the reception mode of the STA 200, particularly if the signal received is sent from an inherently more powerful transmitter, i.e. of the AP 101. This can be exploited beneficially in embodiments of the invention to reduce the rate of energy consumption in the STA 200. For instance, the STA 200 may be powered by its own electrical energy source, e.g. battery, and reducing the rate of energy consumption may be very important. Keeping multiple receivers active all of the time as in the prior art can cause energy consumption to exceed a desirable level, possibly to become prohibitive. However, reducing energy consumption in the reception mode may beneficially allow the rate of overall energy consumption to be kept below a desired level. This is illustrated further by the embodiments of the invention now to be described.

Figure 3:
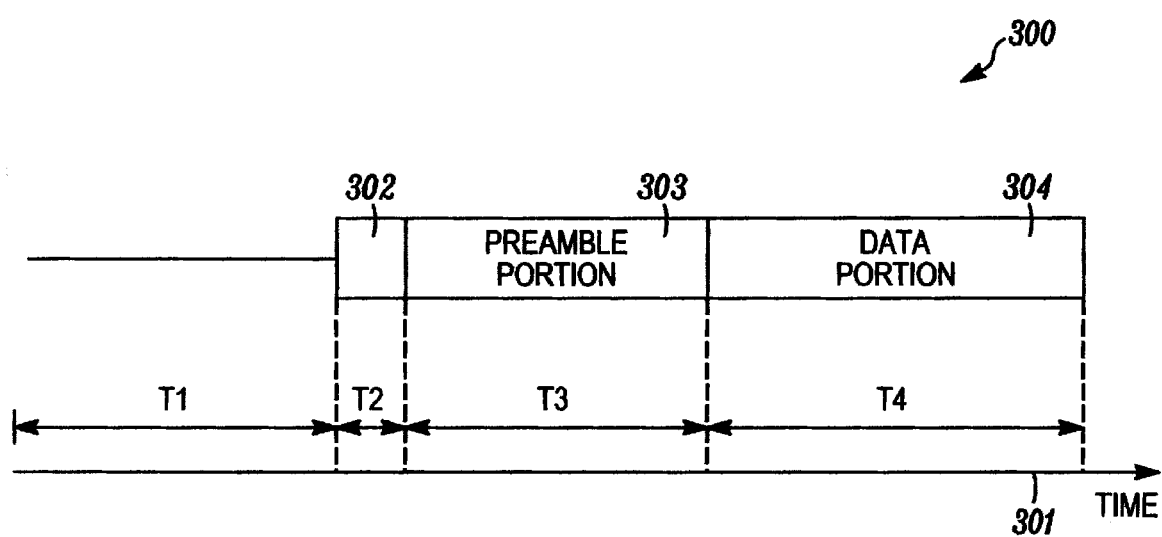
FIG. 3 is a schematic diagram illustrating portions of a signal sent by an Access Point of the system of FIG. 1 relative to time.

FIG. 3 is a schematic diagram illustrating time divided portions of a signal 300 sent by the AP 101 relative to time as indicated on a time axis 301. The signal 300 includes an initial portion 302 followed by a preamble portion 303 followed by a data portion 304. The data portion 304 may include in a known manner user data, 'data traffic', as well as some network information. During a period T1, no signal is received by the STA 200 and the STA 200 may be in a power saving or idle mode. The STA 200 detects in a short period T2 (e.g. 2 to 4 microseconds), the initial portion 302 of the signal 300 and activates its receiver chains. In a period T3, the preamble portion 303 of the signal 300 is received. The preamble portion 303 may for example have a duration together with the initial portion 302 of about 16 microseconds. The preamble portion 303 includes the known data pattern or sequence needed by each of the receiver chains of the STA 200 to make an estimation of the channel for the signal received by each of the receiver chains. As noted earlier, the channel estimations are used in determining the complex weightings needed in subsequent beam forming. During a period T4 which follows the period T3, the data portion 304 of the signal 300 is received.

As noted earlier, it is normal practice in the prior art in a multiple smart antenna terminal used for beam forming to keep all of the receiver chains, once initially activated, to remain active during all following portions of a received signal from an AP, and this may cause excessive energy consumption as noted earlier. However, by the present embodiment of the invention, not all of the receiver chains of the STA 200 are kept active (i.e. kept switched 'on') for receipt of the data portion 304 of the signal 300. For example, one of the receiver chains of the STA 200 is kept active and the other two receiver chains are kept de-activated (kept switched 'off') during the period T4. Although all of the receiver chains need to be active during the period T3 when the preamble of the signal 300 is received, receipt of the data portion 304 of the signal 300 in the period T4 does not need to be carried out in all of the receiver chains. Thus, receipt of the data portion 304 can be carried out in a number of the receiver chains of the STA 200 which is less than the maximum number active during the period T3, e.g. in only one of the receiver chains. This may be possible because the terminal which sends the received signal, the AP 101, transmits a signal that is sufficiently strong when received at the STA 200 that it may be received by a reduced number of receiver chains, e.g. by a single receiver chain, in the STA 200.

The STA 200 may therefore select a single one (or reduced number of) its receiver chains to remain active in the period T4. The other receiver chain(s) may be de-activated when the preamble portion 303 finishes (or earlier, if the weighting calculations required for beam forming have already been completed).

The selection of a single receiver chain (or reduced number of receiver chains) may be carried out in the following manner, for example. In the period T3, the RSSI of the signal received by each of the receiver chains of the STA 200 is measured (in a known manner by the respective RF transceiver of each receiver chain), and each measurement result is provided to the signal processing unit 201. The signal processing unit 201 selects before the end of the period T3 the receiver chain(s) which has provided the best RSSI measurement result(s) to remain active during the following period T4. Such a selection procedure is known per se, but not for the purpose which has been described, and is referred to in the art as 'switched diversity'.

Thus, by reducing the number of receiver chains that are active during the period T4, it is possible beneficially to provide a saving in the rate of electrical energy consumed in the STA 200 in the reception mode. This saving allows better overall saving of electrical energy in the STA 200. Such saving is especially important if the STA 200 is powered by its own source of electrical energy, e.g. a battery.

In a further embodiment of the invention, a modified form of the energy saving procedure which has been described may be applied. In this modified form, there are two alternative modes of operating the reception mode of the STA 200. Selection of one of these modes depends on whether the STA 200 is being powered only by its own source of electrical energy or whether the STA 200 is able to receive electrical energy from an external source, e.g. when a battery of the STA 200 is being charged. Such an external source may for example comprise an electrical supply of a vehicle in which the STA 200 is being used or a main (mains) supply. Thus, in a first mode of operation in the reception mode with no external energy supply, the STA 200 operates in the manner described with reference to FIG. 1 and switched diversity is used to keep active a reduced number of receiver chains, e.g. only one selected receiver chain, during the period T4 of the reception mode. In a second mode of operation in the reception mode of the STA 200 when an external energy supply is provided, and energy saving in the STA 200 is less essential, all of the receiver chains of the STA 200 may be activated during the period T4 when the data portion 304 of the signal 300 is received. This allows an optimal combining of signals from the three receiver chains to be obtained in a manner known as 'maximum ratio combining'. The three signals received in the receiver chains with the complex weightings referred to earlier are combined to give a single combined signal equivalent to a single signal having an RSSI value higher than any of the RSSI values of the individual received signals. The individual signals combine coherently whereas noise associated with the signals is incoherent, so the reception obtained when using all three of the receiver chains is better than when using any one (or any number less than the maximum number) of the receiver chains. Thus, better reception of the data portion 304 is obtained in the second mode of reception mode in the STA 200 than when using the first mode of operation of the reception mode.

Figure 4:
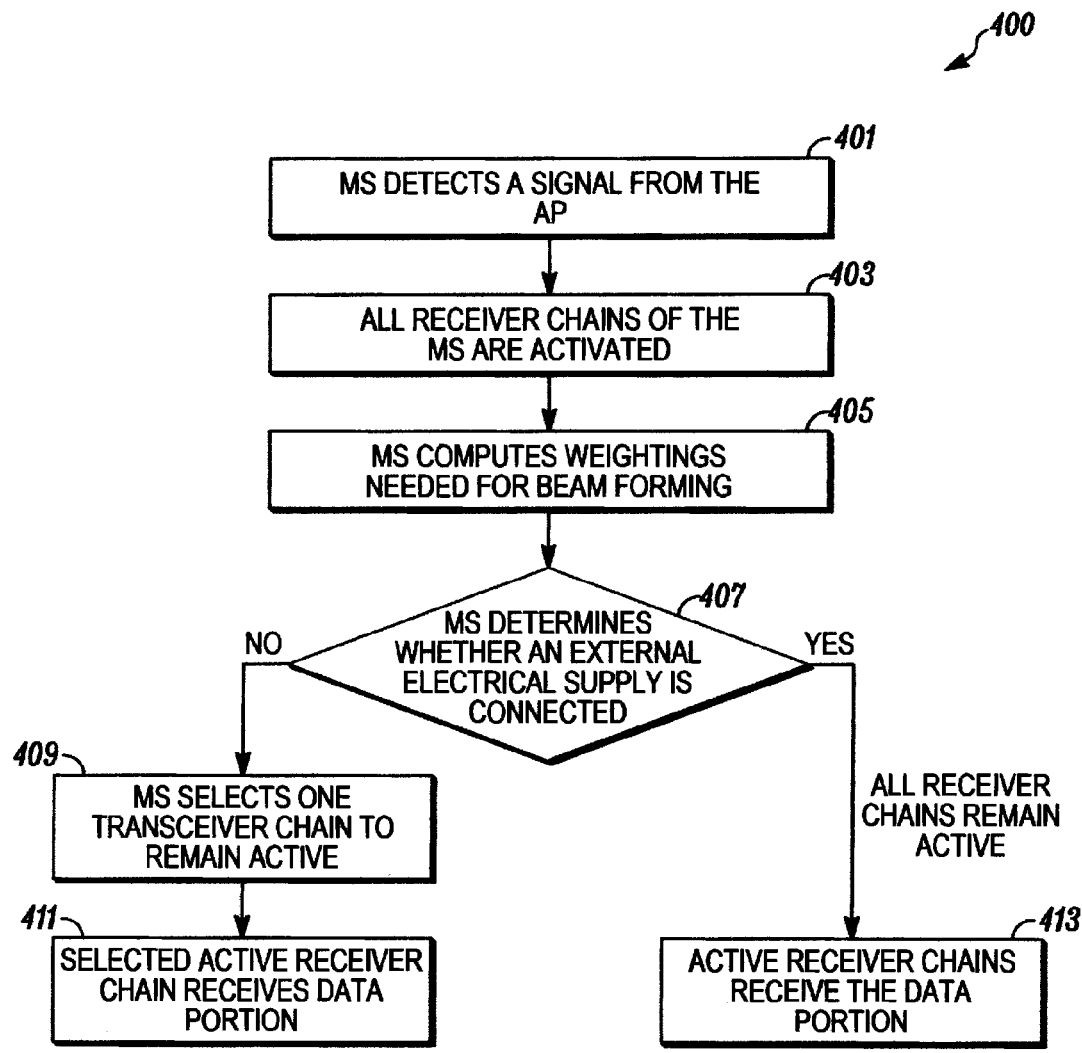
FIG. 4 is a flow chart of an illustrative method embodying the invention of operation in the system of FIG. 1.

FIG. 4 is a flow chart summarising a method 400 embodying the invention using the modified procedure. In a step 401, the STA 200 detects a signal (the signal 300 of FIG. 3) from the AP 101. In a step 403, all of the receiver chains of the STA 200 are activated. In a step 405, which is carried out before the end of the preamble portion 303, the STA 200 computes, e.g. by the signal processing unit 201, complex weightings needed for beam forming (in a subsequent transmission mode) from the signals received in each of the active receiver chains of the STA 200. In a step 407, also carried out before the end of the preamble portion 303, the STA 200 determines whether an external supply of electrical energy is connected to the STA 200. The STA 200 may carry out a detection step in a known way to give the determination in step 407. The detection step may be carried separately, e.g. prior to the start of the method 400 as shown in FIG. 4. If no external supply has been detected, step 407 produces a 'NO' result, and if an external supply has been detected, step 407 produces a 'YES' result.

If step 407 produces a 'NO' result, a step 409 follows, still before the end of receipt of the preamble portion 303 of the signal 300, in which the STA 200 selects one of its receiver chains to remain active. The STA 200 also de-activates its other two receiver chains at this point. In a step 411, the receiver chain of the STA 200 which has been selected to remain active receives the data portion 304 of the signal 300. Steps 409 and 411 illustrate the first mode of operation of the reception mode of the STA 200.

If step 407 produces a 'YES' result, all of the receiver chains of the STA 200 remain active. In a step 413, all of the active receiver chains receive the data portion 304 of the signal 300 and the maximum ratio combining procedure referred to earlier is used to enhance reception of the data portion 304. Step 413 illustrates the second mode of operation of the reception mode of the STA 200.

The embodiments of the invention which have been described beneficially allow electrical energy saving in a client terminal which includes a plurality receiver chains, e.g. employed for the purpose of estimating a channel, e.g. for beam forming during a transmission mode. This is particularly beneficial where the client terminal is powered by its own source of electrical energy and the source can only provide a finite amount of electrical energy. Embodiments of the invention may find use in any wireless communication system using terminals with smart antennas, particularly any such system including terminals operable to receive sufficiently strong signals by a single receiver in a reception mode but needing to use beam forming by the smart antenna system in a transmission mode. Such a system may comprise a WLAN system.

The invention claimed is:

1. A terminal for use in a wireless communication system, the terminal including a plurality of antennas and a plurality of receiver chains each including an associated one of the antennas, the terminal being operable to receive a signal including a plurality of time divided portions including a first portion and a second portion after the first portion, wherein each of the plurality of receiver chains is active when the first portion of the signal is being received and in one mode at least one of the receiver chains is inactive when the second portion of the signal is being received, and wherein the terminal is operable to estimate, from the first portion of the signal, corresponding channel values from the signal received by each of the receiver chains and to calculate weightings from each of the corresponding channel values for use in beam forming by the terminal during a subsequent transmission mode.

2. The terminal according to claim 1, wherein the first portion comprises a preamble portion including data transmitted in a form that is known by the terminal and is required to be received by each of the receiver chains for use in a computation by the terminal.

3. The terminal according to claim 1, which includes at least three antennas and at least three receiver chains each incorporating an associated one of the antennas, wherein when the first portion of the signal is being received each of the at least three receiver chains is active but when the second portion of the signal is being received at least two of the receiver chains are inactive.

4. The terminal according to claim 1, which is operable to detect the received signal in an initial portion of the received signal prior to the first portion and, upon detecting the received signal, is operable to activate its receiver chains so that the receiver chains are active during the receipt of the first portion.

5. The terminal according to claim 1, which is operable to measure a strength of a signal received in each of the receiver chains when active to determine which one of said chains is receiving the strongest signal, and during the second portion of the received signal when at least one of the receiver chains is inactive, to keep active at least the one of the receiver chains determined to be receiving the strongest signal.

6. A terminal for use in a wireless communication system, the terminal including a plurality of antennas and a plurality of receiver chains each including an associated one of the antennas, the terminal being operable to receive a signal including a plurality of time divided portions including a first portion and a second portion after the first portion, wherein each of the plurality of receiver chains is active when the first portion of the signal is being received and in one mode at least one of the receiver chains is inactive when the second portion of the signal is being received, and wherein the terminal is operable to receive signals in one of two alternative modes during reception of the second portion of the received signal, including (i) a first mode, applied when the terminal is powered only by an internal electrical energy source, in which at least one of the receiver chains is inactive and (ii) a second mode, applied when the terminal is powered by an electrical energy source external to the terminal, in which more receiver chains are active compared to the first mode.

7. The terminal according to claim 6 wherein the terminal is operable to allow automatic selection of the second mode when powering by an electrical energy source external to the terminal is detected.

8. The terminal according to claim 1 including a plurality of transmitter chains each including an associated one of the antennas and each associated with a corresponding one of the receiver chains, the terminal being operable to produce in the transmitter chains signals having weightings, obtained from corresponding weightings of signals received in the corresponding receiver channels, to form a directional transmitted RF beam.

9. A method of operation of a terminal in a wireless communication system, the terminal including a plurality of antennas and a plurality of receiver chains each including an associated one of the antennas, the method including:

the terminal receiving a signal including a plurality of time divided portions including a first portion and a second portion after the first portion, wherein each of the plurality of receiver chains is active when the first portion of the signal is being received and in one mode at least one of the receiver chains is inactive when the second portion of the signal is being received;

the terminal estimating, from the first portion of the signal, corresponding channel values from the signal received by each of the receiver chains;

the terminal calculating weightings from each of the corresponding channel values; and the terminal using the calculated weightings in beam forming a signal during a subsequent transmission.

10. The method according to claim 9, wherein the first portion comprises a preamble portion including data transmitted in a form which is known by the terminal and is required to be received by each of the receiver chains for use in a computation by the terminal.

11. The method according to claim 9, further comprising the terminal detecting the received signal in an initial portion of the received signal prior to the first portion and, upon detecting the received signal, activating the receiver chains so that the receiver chains are active during the receipt of the first portion.

12. The method according to claim 11, wherein the terminal comprises a plurality of transmitter chains each including an associated one of the antennas and each associated with a corresponding one of the receiver chains, and wherein the terminal using the calculated weightings in beam forming a single during a subsequent transmission comprises forming a directional transmitted RF beam in the transmitter chains signals having the calculated weightings.

13. The method according to claim 9, further comprising the terminal measuring a strength of a signal received in each of the receiver chains when active to determine which one of the chains is receiving the strongest signal, and during the second portion of the received signal when at least one of the receiver chains is inactive, to keep active at least the one of the receiver chains determined to be receiving the strongest signal.

14. A method of operation of a terminal in a wireless communication system, the terminal including a plurality of antennas and a plurality of receiver chains each including an associated one of the antennas, the method including:

the terminal receiving a signal including a plurality of time divided portions including a first portion and a second portion after the first portion, wherein each of the plurality of receiver chains is active when the first portion of the signal is being received and in one mode at least one of the receiver chains is inactive when the second portion of the signal is being received;

switching the terminal between receiving signals in first and second modes during reception of the second portion of the received signal, the first mode being a mode in which at least one of the receiver chains is inactive and during which the terminal is powered only by an internal electrical energy source, and the second mode being a mode in which more receiver chains are active compared to the first mode and during which the terminal is powered by an electrical energy source external to the terminal.

15. The method according to claim 14, further comprising the terminal automatically selecting the second mode when powering of the terminal by an electrical energy source external to the terminal is detected.

* * * * *

UNITED STATES PATENT AND TRADEMARK OFFICE
CERTIFICATE OF CORRECTION

| | |
|---|---|
| PATENT NO. | : 8,165,545 B2 |
| APPLICATION NO. | : 12/280823 |
| DATED | : April 24, 2012 |
| INVENTOR(S) | : Ben-Ayun et al. |

It is certified that error appears in the above-identified patent and that said Letters Patent is hereby corrected as shown below:

In Column 2, Line 1, delete Heading "SUMMARY OF THE INVENTION".

In Column 2, Line 20, delete "DESCRIPTION" and insert -- DETAILED DESCRIPTION --, therefor.

In Column 4, Line 23, delete "235" and insert -- 255 --, therefor.

Signed and Sealed this
First Day of January, 2013

David J. Kappos
*Director of the United States Patent and Trademark Office*